United States Patent [19]

Iwashita et al.

[11] Patent Number: 4,715,686
[45] Date of Patent: Dec. 29, 1987

[54] LIGHT-PASSIVE DISPLAY DEVICE AND METHOD OF MANUFACTURING SAME

[75] Inventors: Yukihiro Iwashita; Hideaki Okumura, both of Shiojiri, Japan

[73] Assignee: Seiko Epson Corporation, Tokyo, Japan

[21] Appl. No.: 798,094

[22] Filed: Nov. 14, 1985

[30] Foreign Application Priority Data

| Nov. 16, 1984 | [JP] | Japan | 59-241937 |
| Nov. 28, 1984 | [JP] | Japan | 59-252575 |
| Dec. 17, 1984 | [JP] | Japan | 59-265649 |

[51] Int. Cl.$^4$ ............................................. G02F 1/133
[52] U.S. Cl. .............................. 350/339 R; 350/164; 350/337; 350/339 F; 350/347 R; 350/397
[58] Field of Search ........... 350/337, 339 F, 339 R, 350/343, 342, 352, 164, 165, 166, 397, 398; 252/299.62, 299.01, 299.04; 428/207, 1, 215

[56] References Cited

U.S. PATENT DOCUMENTS

| 3,736,047 | 5/1973 | Gelber et al. | 350/339 R |
| 4,025,688 | 5/1977 | Nagy et al. | 350/337 |
| 4,158,484 | 6/1979 | Nishiyama | 350/339 R |
| 4,268,127 | 5/1981 | Oshima et al. | 350/398 |
| 4,364,168 | 12/1982 | Matsuyama et al. | 350/343 |
| 4,561,725 | 12/1985 | Hotta | 350/339 F |
| 4,592,623 | 6/1986 | Yamamoto et al. | 350/337 |
| 4,610,510 | 9/1986 | Funada et al. | 350/343 |
| 4,640,583 | 2/1987 | Hoshikawa et al. | 350/339 R |

FOREIGN PATENT DOCUMENTS

| 52-71258 | 6/1977 | Japan | 350/343 |
| 54-40026 | 12/1979 | Japan | 350/343 |
| 56-122011 | 9/1981 | Japan | 350/343 |
| 60-175033 | 9/1985 | Japan | 350/343 |

Primary Examiner—John K. Corbin
Assistant Examiner—Martin Lerner
Attorney, Agent, or Firm—Blum Kaplan

[57] ABSTRACT

A viewing plate for liquid crystal displays and the like which has an anti-reflecting coating is sealed to the front surface of a liquid crystal display element by means of a transparent adhesive layer of pre-embossed thermoplastic material. The assembled viewing plate, the transparent adhesive material, and the display are heated while the space between the layers is evacuated to remove included air and to press the parts together, forming an integral liquid crystal display having uniform optical qualities.

29 Claims, 2 Drawing Figures

LIGHT-PASSIVE DISPLAY DEVICE AND METHOD OF MANUFACTURING SAME

BACKGROUND OF THE INVENTION

The present invention relates to light passive display devices, such as liquid crystal displays, electrochromic displays, PLZTs, and the like. More particularly, the invention relates to improvements in the structure of such devices which provide improved visibility of the display, enhancing visual recognition, and to a method of producing the display device. Although the invention is described herein by way of example in the context of a liquid crystal display of the light-passive type, it is to be understood that the present invention is applicable to other displays.

A liquid crystal display which uses light-passive display elements depends, for its visual effect, upon external light and is therefore subject to degredation resulting from side effects fo the external light, such as reflection from the display surface. In this regard, such displays differ to a considerable degree from luminous display devices such as a CRT (cathode ray tube), an LED (a light-emitting diode display), etc., where the source of illumination is internal to the device. Thus, in light-passive display devices, incident light which is reflected by the first surface of the display device is not available for reflection therethrough and a further degredation of display performance results.

While the visibility of the display can be improved by covering the front surface of the liquid crystal display element with an interfering filter, such as a thin polarizing film on a plate, or by reducing the direct reflection of light from the front by altering the surface of the polarizing plate or of the device so as to scatter the light, such plastic surfaces are easily damaged and further reduction of the reflected light ensues due to the wear and tear. In one attempt to solve the problem, the effect of wear was minimized by using a replaceable plastic sheet; in another case, a glass plate was used which provides a surface which is less subject to wear. However, the use of the added protective sheet or plate results in degradation of visibility because of reflections produced at their surfaces. Some of the problems due to reflections can be solved by causing the plastic sheet or glass plate to adhere to the face of the liquid crystal display element. Heretofore, however, there has been no method of inexpensively causing such a transparent sheet or plate to adhere in a stable manner through the use of curing temperatures which would not affect the liquid crystal display element.

Conventionally, then, such methods have used a liquid adhesive agent, or the like, to produce adhesion. However, when a liquid adhesive agent is used, special equipment is required for the application of solvent, and, even when no solvent is required, handling of the liquid adhesive agent is tricky and difficult. On the other hand, when a tacky adhesive agent is used, dust and impurities are apt to be deposited thereon and so to be included in creases or folds in the surface which cannot easily be removed, and the result is poor adhesion.

The foregoing problems have been particularly acute in fabricating displays which require accurate adhesion of the protective plate so as to produce optical clarity. Further, when the above-mentioned methods are used, the process takes a great amount of time because of the number of substrates which much be caused to adhere in succession.

SUMMARY OF THE INVENTION

The present invention provides a light-passive display device in which reductions in contrast caused by the loss of light by reflection from the front surface of a reflecting display element, or the like, using liquid crystals is prevented. The display device of the invention provides superior endurance against abrasion as well as superior visibility of display.

The display device of the invention includes a glass plate which has been treated against reflection and which has been caused to adhere to the front surface of a light-passive liquid crystal display element by the use of a material which has substantially the same index of refraction as the material of the glass plate. To bring about adhesion of the treated glass plate to the front of the display element, the transparent adhesive film is placed between these elements in a stack, and the stack is placed in an evacuated space where it is heated while pressure is applied to complete the adhesion. It is a feature of the invention that the accuracy of adhesion is enhanced by employing a pre-embossed thermoplastic film made, for example, of polyvinyl butyral, ethylene-vinyl acetate copolymer, or the like, as an adhesive layer. This method of producing precise adhesion is particularly effective when two or more substrates, at least one of which is flexible, are to be adhered with optical accuracy. It is also applicable when, for example, a flexible plastic polarizing screen is to be fastened to an electrode-carrying substrate of a liquid crystal cell.

It is to be understood that display devices, to which the teachings of the present invention are generally applicable, include devices in which a liquid crystal or the like is used as a light switch for selectively preventing light from a light source from passing to a graphic display or to the photosensitive body of a printer. It is also to be understood that, although the description of circuits for driving such display devices is omitted from this specification, the display devices are intended to be driven by electrical signals in a manner well known in the art.

It is an object of the present invention to provide display devices, such as liquid crystal display devices of the light-passive type, in which the reduction in contrast caused by the reflection of light from the front surface of the device is prevented.

A further object of the invention is to provide a display device which has an external surface which is highly resistant to abrasion.

Another object of the invention is to provide a method of producing a liquid crystal display device of the light-passive type by means of which a display element of liquid crystal, or the like, can be caused easily to adhere to a transparent glass or plastic faceplate, or the like.

Still another object of the invention is to provide a display device of the light-passive or other type in which a glass plate or other adherent transparent cover serves as a reinforcement of the display element.

It is still another object of the invention to provide a display element of the liquid crystal type or the like, which has improved optical properties.

A still further object of the invention is to provide a method of producing precise, uniform adhesion of a transparent glass or plastic cover plate to a liquid crystal display element.

Still another object of the invention is to provide a method for producing a number of substrates for use in liquid crystal displays to which a transparent glass or plastic plate is precisely adhered at the same time.

Still other objects and advantages of the invention will in part be obvious and will in part be apparent from the specification.

The invention, accordingly, comprises the several steps and the relation of one or more such steps with respect to each of the others, and the article possessing the features, properties and the relation of elements, which are exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE INVENTION

The light-passive display device of the invention will be described with reference to FIGS. 1 and 2, as detailed in the following examples.

EXAMPLE 1

Figure 1:
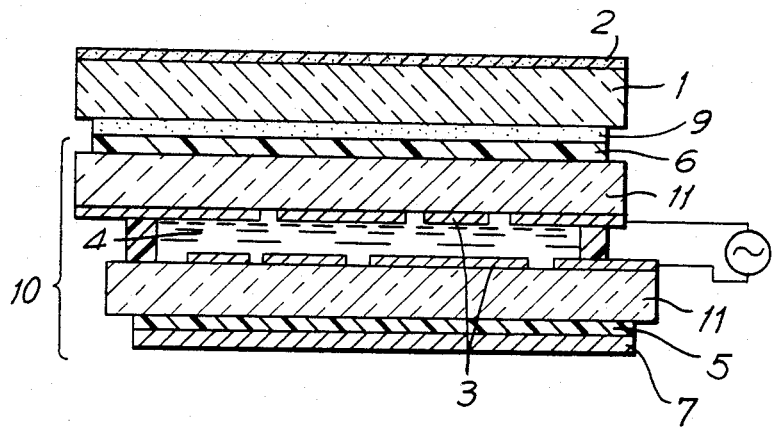
FIG. 1 is an elevational view in cross-section showing an embodiment of a light-passive display device fabricated in accordance with the present invention.

A light-passive liquid crystal display device, having the structure shown in FIG. 1, was made by coating a soda-lime glass plate 1 having a refractive index of about 1.52 and a thickness of about 1 mm, with a layer of silicon dioxide ($SiO_2$) of about 1,000 Å thickness, a layer of zirconium oxide ($ZrO_2$) of about 1,400 Å thickness, and a layer of magnesium fluoride ($MgF_2$) of about 1,000 Å thickness, in succession from the bottom up; these layers are generally designated by the number 2 in FIG. 1. Glass plate 1 was fastened to a liquid crystal display element 10 having soda-lime glass substrates 11 which were provided on their respective inner surfaces with transparent electrodes 3 of indium tin oxide (ITO) which were disposed so as to face each other through a layer 4 of liquid crystal. The respective inner surfaces of two polarizing plates 5 and 6 were caused to adhere to the respective outer surfaces of glass substrates 11 by means of an adhesive agent, a tacky adhesive agent, or the like. An irregular reflecting plate 7 was caused to adhere to the outer surface of lower polarizing plate 5 in the same manner. An acrylic adhesive agent of the ultraviolet-ray-hardening type, which had a refractive index of about 1.48 after hardening, was used as an adhesive layer 9 for causing glass plate 1 and liquid crystal display element 10 to adhere to each other.

The original rate of linear reflection from liquid crystal display element 10 of about 7% was found to be reduced to 4% after the glass plate had been attached. Compared visually, the display was clearer when glass plate 1 was attached than when the display had no such glass plate. The surface hardness of the anti-reflection coating was above 9H in pencil hardness, and the surface was not harmed by rubbing lightly with a wire brush, etc. When the liquid crystal display assembly was left at 60° C. and 90% relative humidity for 200 hours, no tears or air bubbles were found in adhesive layer 9, nor were changes in the optical characteristics observed.

EXAMPLE 2

The liquid crystal display element of Example 1 was used, along with an anti-reflection treated glass plate of soda-lime of about 1 mm thickness, one surface of which was treated with acid to be finely porous. Polyvinyl butyral plastic, having a refractive index of about 1.51 and about 0.3 mm in thickness, was used as an adhesive layer. The liquid crystal display assembly and the anti-reflection treated glass were caused to adhere to each other at a temperature of about 80° C. at which there was no deterioration of the polarizing plates.

The rate of linear reflection of the liquid crystal display assembly thus formed was about 3%. Under visual inspection, this display assembly was superior in visual recognition to that of Example 1. The surface hardness was in a range of 4H to 6H in pencil hardness, being substantially greater than the surface hardness of the polarizing plate and providing a structure of practical utility.

EXAMPLE 3

The structure of the assembly used was like that of Example 1. A resin sheet obtained by denaturing an ethylene-vinyl acetate copolymer was used as an adhesive agent.

The rate of linear reflection with this structure was about 3%.

EXAMPLE 4

A glass plate having a mechanically abraded surface was used as the anti-reflection treated glass. A hot-melt adhesive agent of ethylene-vinyl acetate was used to cause the treated glass to adhere to the liquid crystal display element. In this case, a slight off-shading of the displayed image was produced by an irregular reflecting layer in the surface. However, the device of this Example presented no significant problems in practical use and provided improved visual recognition when compared with displays in which glass without anti-reflection treatment was used.

In addition to the adhesive agents described in the foregoing Examples, other adhesive agents having superior transparency such as an epoxy adhesive agent, a double-fluid acrylic adhesive agent, a tacky silicone adhesive agent, or the like, can be used as adhesive agent 9.

Examples setting forth another aspect of the invention will now be described.

EXAMPLE 5

Figure 2:
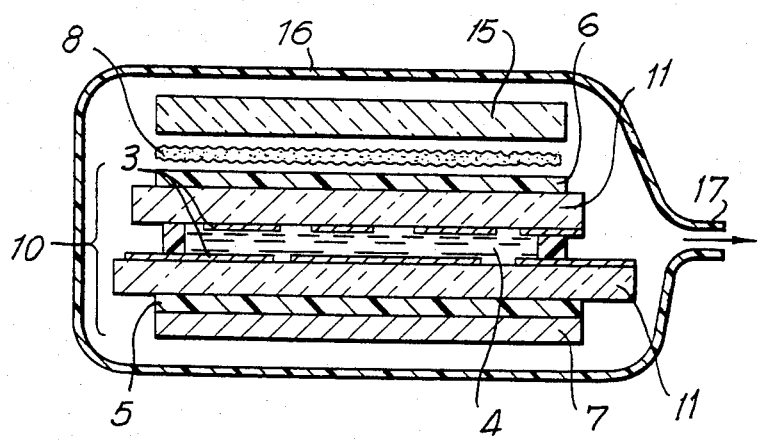
FIG. 2 is an elevational view in cross-section of an apparatus for producing the display device of the present invention.

The liquid crystal display element 10 which was arranged, as shown in FIG. 2, by placing two glass substrates 11 having electrodes on their respective inner surfaces in opposition to each other across a liquid crystal layer 4. Two polarizing plates 5, 6 made of iodine dyed polyvinyl acetate (PVA), protected by cellulose acetate, were caused to adhere to the respective outer surfaces of glass substrates 11. An irregular reflecting plate 7 was joined to the outer surface of the polarizing plate 5.

A plastic polyvinyl butyral sheet having a pre-embossed surface was used as adhesive film 8. A soda-lime glass plate of about 1.1 mm thickness was used as a transparent cover plate 15.

Liquid crystal display element 10, embossed film 8, and glass plate 15 were stacked one-on-one, in the order given, and placed in an envelope 16 which was made of polyethylene terephthalate. Envelope 16 was then evacuated, by means of a vacuum pump attached to outlet 17, to a vacuum level of about $10^{-1}$ Torr., and outlet 17 was then sealed closed by the application of heat. Envelope 16 and its contents were then heated to about 80° C. and left for about 1 hour at a pressure of about 5 atm. in an autoclave. Envelope 16 was then removed from the autoclave and the liquid crystal display element 10 was taken out of envelope 16. The result was that the embossments of film 8 were eliminated (crushed), while glass plate 15 and liquid crystal display element 10 had been caused to adhere to each other with optical accuracy.

The liquid display assembly thus obtained was then left in an environment of about 60° C. at 90 percent relative humidity, for about 200 hours. When inspected, the assembly had no air bubbles or tears in the adhesive layer, while the characteristics of the device were substantially the same as in the initial state.

EXAMPLE 6

The same structure was used as in Example 5, but isobutylene-isoprene rubber was used in envelope 16. Envelope 16, containing the liquid crystal assembly, was placed in an oven at about 90° C. for about half an hour while evacuating the air from envelope 16 by using a vacuum pump connected at opening 17.

In the same manner as in Example 5, the liquid crystal display assembly was taken out of the envelope and the characteristics were investigated. Although a polarizing plate 6 was slightly shaded, there was no significant problem in practical use.

EXAMPLE 7

The same structure was used as in Example 5 in which envelope 16, a liquid crystal display element, an adhesive film, and a glass plate were assembled, but in which inlet opening 17 of the envelope was sealed after the assembly was evacuated. The assembly was put in silicone oil heated up to about 70° C. and left for half an hour while under pressure of about 8 atm. produced by a piston.

When removed, the liquid crystal display element had the same characteristics as in Example 5.

In addition to the above-mentioned examples, it was found that when a liquid crystal display assembly was produced in the same manner as above but provided with a glass plate which had an anti-reflection treated surface, a greater degree of improvement in visual recognition could be obtained. Again, a plastic plate, or the like, which has a surface which had been hardened so as to be difficult to mar may be adhered to the front surface of a liquid crystal display element instead of the glass plate.

Next, a method according to a further aspect of the present invention will be described.

Since it has no tucks in its surface, a thermoplastic film which has been embossed doesn't catch dust in the same way as does a tacky adhesive agent. Even when dust is deposited on the surface, it can be removed easily by blowing on the surface with air or the like, or by washing the surface with water. In this way a clear adhesive layer can easily be obtained. Further, since the adhesives are in the form of films, they can be handled easily. The use of adhesive film which has been embossed also aids in obtaining effective extraction of air from the space between the substrate and the adhesive film sticking the substrate is being applied to the adhesive film, and results in optically clear adhesion of the parts. Adhesion can be assured by the application of heat and pressure by means, for example, of a heated roller, heating in a vacuum pack, etc. Adhesion can be achieved, using these methods, at a temperature of 60°-100° C.

Further, when pre-embossed thermoplastic films are used, a large number of substrates can be processed at the same time by means of the heated roller, vacuum pack heating, or the like, when the substrates are stacked one-on-one with the pre-embossed films interposed therebetween.

Examples of the method of the present invention will be described below as applied, by way of example, to the manufacture of a liquid crystal display element.

EXAMPLE 8

In order to cause a polarizing plate to adhere to the liquid crystal cell of a liquid crystal display element, a polyvinyl butyral film having an embossed surface was used. The liquid crystal cell had two glass substrates and dimensions of about 8 cm×20 cm. The polarizing plate was obtained by sandwiching a dyed polyvinyl acetate (PVA) film between two cellulose triacetate (TAC) films. The embossed polyvinyl butyral film was about 0.3 mm in thickness. The liquid crystal cell, the polyvinyl butyral film, and the polarizing plate aere stacked one-on-one in this order, and the stack was received in a rubberlike envelope. The envelope containing the stack was placed in a constant temperature oven at about 80° C. and left for about half an hour, while air in the envelope was exhausted to about 1 Torr. by means of a vacuum pump.

When removed, the test piece had no dust or air bubbles included in the adhesive layer. Good optical adhesion was realized in which light absorption or reflection due to the adhesive layer could be disregarded in practical use. After the test piece had been at room temperature for about a day, it was subjected to a temperature of 60° C. at 90% RH for 500 hours. No tears or air bubbles were found in the adhesive layer and the initial optical state was maintained.

EXAMPLE 9

A liquid crystal cell, a polarizing plate, and a PET film having a surface which had been anti-reflection processed were stacked one-on-one with polyvinyl butyral films interposed therebetween and caused to adhere to each other in the same way as in Example 8, thereby obtaining optically uniform adhesion. After the test piece was left at 60° C. and 90% RH for 500 hours, no change was found to have occurred in performance of the adhesive layer.

EXAMPLE 10

A PET film having a surface which had been anti-reflection processed was caused to adhere to a glass plate serving as the front surface of a guest-host type liquid crystal display element in a display assembly by using pre-embossed film of ethylene-vinyl acetate copolymer. The liquid crystal display element, the pre-embossed film, and the PET film were stacked one-on-one in the order given, and then passed through a heated roller at 90° C. under pressure of about 500 g/cm², at a speed of about 5 mm/sec, to cause them to adhere to each other. As in the previous example, uniform optical adhesion was obtained.

Although the above-mentioned examples involved a liquid crystal display element, the same methods as those described above can be applied to other displays requiring accurate adhesion, and to flat displays in particular. For example, and not by way of limitation, the same beneficial effect can be obtained not only in light-passive display elements, as described above, but also in transmissive display elements.

The invention can also be applied to multi-layer display elements and to displays in which the electrode-bearing substrates of a liquid crystal display element, or the like, are made of an alkaliless glass, or a plastic film of polysulfone, polyether sulfone, polyethylene terephthalate, or the like, etc. (The term electrode substrate is to be understood to include an electrode substrate having polarizing plates integrated therewith.)

As set forth herein, the present invention makes possible the provision of a liquid crystal display assembly which has great surface endurance and which is superior in visual recognition because of reduced surface reflection.

Further, should the outer glass plate of the liquid crystal display assembly of the invention be broken, the glass serves as a protective device, since, owing to the action of the adhesive layer, the broken glass will not be scattered outward. An improved, stable structure is the result.

By following the teachings of the invention, visual recognition of a light-passive liquid crystal display device or the like is improved when the device is driven at a high duty cycle, and it is possible to expand the limits of the high duty-cycle driving. Light-passive display devices employing the teachings of the invention can be used as displays in a measuring instrument, a car, etc., in which not only high visual recognition but also long life and endurance are required; the range of application of liquid crystal displays is thus expanded.

The manufacturing of display devices in accordance with the present invention makes possible the production of a glass plate which adheres to the surface of a liquid crystal display element without deterioration of the optical characteristics of the display element and, at the same time, which provides a display element having a surface which cannot be damaged easily. In carrying out the method, the functioning of the liquid crystal display element can be improved by using an anti-reflection treated glass plate, a colored glass plate, or the like, in place of a clear glass plate. By using the foregoing uniformly accurate adhesive method, it is possible to obtain an optically uniform adhesive layer to which no dust or impurities are attached. Further, a number of such substrates can be formed at the same time.

The adhesive layers resulting from the method have great endurance as described above in the examples, so that the range of useful application is wide.

The above-described invention thus provides a method which overcomes the disadvantages of conventional assembly methods and which is useful particularly in fields requiring accurate, optically uniform adhesion between layers, without including dust or impurities (other than elements of the displays such as those recited in the foregoing examples).

It will thus be seen that the objects set forth above, among those made apparent from the preceeding description, are efficiently attained and, since certain changes may be made in carrying out the above method and in the articles set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A liquid crystal display device having at least one transparent substrate and improved optical properties due to a reduction in light reflected from the exterior surface of the at least one transparent substrate, comprising:
   a polarizing plate disposed on the exterior surface of the at least one transparent substrate;
   a transparent glass plate having an anti-reflection surface on the polarizing plate;
   an adhesive layer provided on at least a portion of the interface between the polarizing plate and the glass plate on the side opposite the anti-reflection surface for causing the glass plate to adhere to the polarizing plate; and
   wherein at least the at least one transparent substrate, the polarizing plate and the glass plate have substantially the same refractive index.

2. The liquid crystal display device of claim 1, wherein the adhesive layer has substantially the same refractive index as the at least one transparent substrate, the polarizing plate and the glass plate.

3. The liquid crystal display device of claim 1, wherein the adhesive layer is provided along the periphery of the interface between the polarizing plate and the glass plate.

4. The display device of claim 1, wherein the adhesive layer is an acrylic group adhesive agent of the ultra-violet ray hardening type.

5. The display device of claim 1, wherein the glass plate is soda-lime glass.

6. The display device of claim 1, wherein the anti-reflection surface is a composite structure including at least one layer of silicon dioxide, at least one layer of zirconium oxide, and at least one layer of magnesium fluoride.

7. The display device of claim 1, wherein the anti-reflection surface is a finely porous glass surface.

8. The display device of claim 1, wherein the adhesive layer is a polyvinyl butyral film.

9. The display device of claim 1, wherein the anti-reflection surface is mechanically abraded glass.

10. The display device of claim 1, wherein the adhesive layer is transparent and is selected from the group consisting of a resin sheet obtained by denaturing an ethylene-vinylacetate copolymer, a hot-melt of ethylene-vinylacetate, an epoxy adhesive agent, a double-fluid acrylic adhesive agent, and a tacky silicone adhesive agent.

11. The display device of claim 1, wherein both substrates are transparent and a polarizing plate is provided on the exterior surface of each substrate.

12. The display device of claim 11, wherein the polarizing plates are iodine-dyed polyvinyl acetate.

13. A method of producing a liquid crystal display assembly including a liquid crystal element having at least one transparent substrate, a polarizing plate provided on the exterior surface of the at least one transparent substrate and a transparent glass anti-reflection plate which adheres with optical uniformity on the polarizing plate, comprising:
adhering a polarizing plate to the exterior surface of the at least one transparent substrate;
placing a transparent adhesive film on at least a portion of the polarizing plate;
placing a transparent glass anti-reflection plate on the adhesive film to form an assembly;
heating the assembly; and
applying pressure to the assembly while it is heated.

14. The method of claim 13, wherein the step of applying pressure to the assembly comprises:
placing the assembly in a flexible, evacuable envelope; and
evacuating the envelope, whereby uniform pressure is applied to the assembly while it is heated.

15. The method of claim 13, wherein the step of applying pressure to the assembly comprises:
placing the assembly in a flexible, evacuable envelope comprising polyethylene terephthalate; and
evacuating the envelope, whereby uniform pressure is applied to the assembly while it is heated.

16. The method of claim 13, wherein the step of applying pressure to the assembly comprises:
placing the assembly in a flexible, evacuable envelope comprising isobutylene-isoprene rubber; and
evacuating the envelope, whereby uniform pressure is applied to the assembly while it is heated.

17. The method of claim 13, wherein the transparent adhesive film comprises polyvinyl butyral plastic and the transparent plate comprises a soda-lime glass plate and wherein the step of applying uniform pressure to the assembly comprises:
placing the assembly in a flexible, evacuable envelope; and
evacuating the envelope, whereby pressure is applied to the assembly while it is heated.

18. The method of claim 13, wherein the transparent adhesive film comprises a pre-embossed thermoplastic film and wherein the step of applying uniform pressure to the assembly comprises:
placing the assembly in a flexible, evacuable envelope; and
evacuating the envelope, whereby pressure is applied to the assembly while it is heated.

19. The method of claim 13, wherein the transparent adhesive film comprises a pre-embossed ethylene-vinylacetate copolymer and the transparent plate comprises a PET film, and wherein the steps of applying heat and pressure to the assembly comprise:
passing the assembly through a heated roller.

20. The method of claim 19, further comprising:
maintaining the roller at about 90° C.;
causing the roller to apply pressure of about 500 g/cm² to the assembly while it is passing through; and
passing the assembly through the roller at a speed of 5 mm/sec.

21. The method of claim 13, wherein the transparent adhesive film is pre-embossed, the transparent plate comprises a dyed film of polyvinyl acetate sandwiched between films of cellulose triacetate, and the step of applying pressure to the assembly comprises:
placing the assembly in a flexible, evacuable envelope; and
evacuating the envelope to apply pressure to the assembly while it is heated.

22. The method of claim 13, wherein the steps of heating and applying pressure comprise:
sealing the assembly in a flexible envelope;
evacuating the envelope;
heating the sealed envelope in a hot fluid; and
pressing the envelope by a piston while the envelope is heated in the hot fluid so as to apply pressure to the assembly.

23. The method of claim 13, wherein the steps of heating and applying pressure comprise the steps of:
sealing the assembly in an envelope of isobutylene-isoprene rubber;
evacuating the envelope;
heating the sealed envelope in silicone oil at about 70° C.; and
pressing the envelope by a piston at about 8 atm while the envelope is heated in the oil.

24. The method of claim 13, in which the electro-optical display element comprises two glass substrates having a layer of liquid crystal therebetween, a plurality of electrodes on the inner surface of each substrate, and a polarizing plate of polyvinyl acetate adhering to the outer surface of each glass substrate, the method comprising the further steps of:
placing the assembly in an envelope of polyethylene terephthalate; and
evacuating the envelope to apply pressure to the assembly while the assembly is heated.

25. The method of claim 24, in which the adhesive film comprises a pre-embossed polyvinyl butyral sheet, and further comprising:
maintaining the envelope at a pressure of about 5 atm while the envelope is heated to 80° C.

26. The method of claim 13, in which the electro-optical display element comprises two glass substrates with a layer of liquid crystal therebetween, a plurality of electrodes on the inner surface of each substrate, and a polarizing plate of polyvinyl acetate adhering to the outer surface of each glass substrate, the method comprising the further steps of:
placing the assembly in an envelope of isobutylene-isoprene rubber; and
evacuating the envelope to apply pressure to the assembly while the assembly is heated.

27. The method of claim 26 and further comprising the step of:
maintaining the envelope at about 80° C. for about one half hour.

28. The method of claim 13, wherein the adhesive film is a pre-embossed thermoplastic film.

29. A liquid crystal display device having a liquid crystal panel including two glass substrates having a liquid crystal material therebetween, a plastic polarizing plate mounted on the exterior surface of at least one of the substrates and a glass plate having an anti-reflection layer mounted on the polarizing plate wherein the glass plate has a refractive index that is substantially the same as the refractive index of the glass substrates.

* * * * *